US012693646B2

(12) United States Patent
Saeki et al.

(10) Patent No.: US 12,693,646 B2
(45) Date of Patent: Jul. 28, 2026

(54) MASTER UNIT AND COMMUNICATION SYSTEM

(71) Applicant: FANUC CORPORATION, Minamitsuru-gun (JP)

(72) Inventors: Masahiro Saeki, Minamitsuru-gun (JP); Shinichi Kuwahata, Minamitsuru-gun (JP); Asunaro Maeda, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 390 days.

(21) Appl. No.: 18/282,250

(22) PCT Filed: Mar. 11, 2022

(86) PCT No.: PCT/JP2022/010776
§ 371 (c)(1),
(2) Date: Sep. 15, 2023

(87) PCT Pub. No.: WO2022/202389
PCT Pub. Date: Sep. 29, 2022

(65) Prior Publication Data
US 2024/0168448 A1 May 23, 2024

(30) Foreign Application Priority Data

Mar. 24, 2021 (JP) ................................. 2021-050020

(51) Int. Cl.
*G05B 19/05* (2006.01)
*G05B 19/042* (2006.01)

(52) U.S. Cl.
CPC ........... *G05B 19/05* (2013.01); *G05B 19/042* (2013.01); *G05B 2219/1215* (2013.01); *G05B 2219/2231* (2013.01)

(58) Field of Classification Search
CPC .......... G05B 19/054; G05B 2219/1105; G05B 2219/1109; G05B 2219/2231;
(Continued)

(56) References Cited

U.S. PATENT DOCUMENTS

| | | | |
|---|---|---|---|
| 6,609,034 B1 | 8/2003 | Behrens et al. | |
| 2015/0039099 A1 | 2/2015 | Mizutani | |

(Continued)

FOREIGN PATENT DOCUMENTS

| | | | |
|---|---|---|---|
| CN | 110096021 A | 8/2019 | |
| EP | 2 560 061 B1 | 4/2020 | |

(Continued)

OTHER PUBLICATIONS

International Search Report for PCT/JP2022/010776 dated May 17, 2022.

(Continued)

*Primary Examiner* — Christopher W Carter
(74) *Attorney, Agent, or Firm* — Sughrue Mion, PLLC

(57) ABSTRACT

A master unit for transmitting signals to devices connected to I/O units is divided into: a connector module having a first connector and a main module having a master processing circuit, a second connector, a branch terminal, and a power supply part. The second connector and the master processing circuit are connected by first connection terminals provided to the connector module and the main module.

5 Claims, 6 Drawing Sheets

(58) Field of Classification Search
CPC .......... G05B 19/052; G05B 2219/1215; H05K
7/1465; H05K 7/1484
See application file for complete search history.

(56) References Cited

U.S. PATENT DOCUMENTS

| | | | |
|---|---|---|---|
| 2019/0278733 A1 | 9/2019 | Kessler et al. | |
| 2020/0401547 A1* | 12/2020 | Kawabe | G06F 1/3268 |
| 2021/0065650 A1 | 3/2021 | Nien et al. | |
| 2022/0113787 A1* | 4/2022 | Tsai | G06F 1/26 |

FOREIGN PATENT DOCUMENTS

| | | | |
|---|---|---|---|
| JP | 09-247766 | A | 9/1997 |
| JP | 10-187309 | A | 7/1998 |
| JP | 2002-091519 | A | 3/2002 |
| JP | 2008-097523 | A | 4/2008 |
| JP | 2011-130307 | A | 6/2011 |
| JP | 2016-110460 | A | 6/2016 |
| JP | 2018-157456 | A | 10/2018 |
| JP | 2019-114085 | A | 7/2019 |
| JP | 2021-002172 | A | 1/2021 |
| TW | M353410 | U1 | 3/2009 |
| TW | 202110169 | A | 3/2021 |
| WO | 2020/135912 | A1 | 7/2020 |

OTHER PUBLICATIONS

Written Opinion for PCT/JP2022/010776 dated May 17, 2022.
Extended European Search Report dated Mar. 10, 2025 in Application No. 22775181.5.
Communication dated Nov. 28, 2025 from the United States Patent and Trademark Office in U.S. Appl. No. 18/282,339.

* cited by examiner

F I G. 5
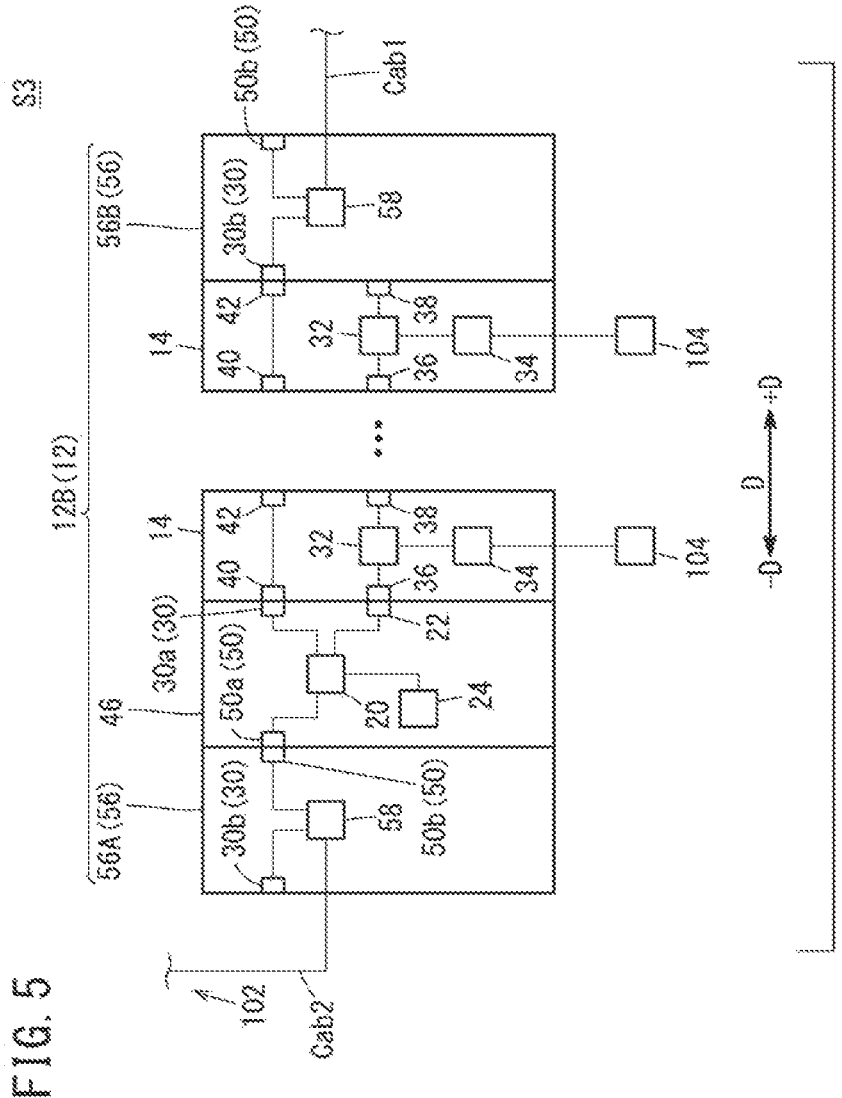

MASTER UNIT AND COMMUNICATION SYSTEM

This Application is a National Stage of International Application No. PCT/JP2022/010776 filed Mar. 11, 2022, claiming priority based on Japanese Patent Application No. 2021-050020 filed Mar. 24, 2021, which are incorporated herein in their entirety.

TECHNICAL FIELD

The present invention relates to a master unit for transmitting signals to a device via an I/O unit and also relates to a communication system including such a master unit.

BACKGROUND ART

JP 2016-110460 A discloses a programmable logic controller system. The programmable logic controller system includes a base unit (master) and a plurality of expansion units (slaves). The base unit and the plurality of expansion units are daisy-chain connected together, with the master unit being at the head. Each of the plurality of expansion units is, for example, an I/O unit. The base unit transmits and receives signals to and from a controlled device via the plurality of expansion units. The controlled device is, for example, a sensor or an actuator.

SUMMARY OF THE INVENTION

The master unit and the plurality of I/O units are arranged along a predetermined installation direction with the master unit at the head. The terminal of the master unit and the terminal of the I/O unit next to each other are connected to each other. The terminals of the adjacent I/O units are connected to each other. As a result, the master unit and the plurality of I/O units are communicably connected to each other. Hereinafter, a group including a master unit and a plurality of I/O units which are communicably connected to each other is also referred to as a "station".

When a plurality of stations are installed, the operator sequentially connects the master unit of each station with respect to the control device. Here, the master unit of each station is connected by a connection member such as a cable separately prepared by an operator.

Here, there is a case where two stations are arranged in the above-described predetermined installation direction. Also in this case, the operator connects the heads (master units) of the two stations to each other by the connection member. Here, a plurality of I/O units connected to one of the master units are installed between the master units of the two stations. In this case, the operator has to wire the connection member so as to bypass the plurality of I/O units.

The present invention has the object of solving the aforementioned problems.

According to a first aspect of the present invention, there is provided a master unit that transmits a signal, via an I/O unit, to a device connected to the I/O unit, the master unit including: a master processing circuit configured to perform signal processing; a first connector configured to be connected to another master unit provided in a subsequent stage of the master processing circuit; a second connector configured to be connected to a control device provided in a preceding stage of the master processing circuit or another master unit provided in the preceding stage; a branch-line terminal configured to be connected to the I/O unit; and a power supply unit configured to supply electric power to the master processing circuit, wherein the master unit is divided into: a first connector module including the first connector; and a main module including the master processing circuit, the second connector, the branch-line terminal, and the power supply unit, wherein the second connector, the branch-line terminal, and the power supply unit are connected to the master processing circuit, and wherein each of the first connector module and the main module further includes a first connection terminal configured to connect the first connector and the master processing circuit via the I/O unit.

According to a second aspect of the present invention, there is provided a communication system including an I/O unit to which a device is connected, and a master unit configured to transmit a signal to the device via the I/O unit, wherein the master unit includes: a master processing circuit configured to perform signal processing; a first connector configured to be connected to another master unit provided in a subsequent stage of the master processing circuit; a second connector configured to be connected to a control device in a preceding stage of the master processing circuit or another master unit provided in the preceding stage; a branch-line terminal configured to be connected to the I/O unit; and a power supply unit configured to supply electric power to the master processing circuit, wherein the master unit is divided into: a first connector module including the first connector; and a main module including the master processing circuit, the second connector, the branch-line terminal, and the power supply unit, wherein the second connector, the branch-line terminal, and the power supply unit are connected to the master processing circuit, wherein each of the first connector module and the main module further includes a first connection terminal configured to connect the first connector and the master processing circuit via the I/O unit, and wherein the I/O unit includes: a preceding-stage main-line terminal and a preceding-stage branch-line terminal configured to be connected to the first connection terminal and the branch-line terminal of the main module provided in a preceding stage of the I/O unit; a subsequent-stage branch-line terminal configured to be connected to the preceding-stage branch-line terminal of another I/O unit provided in a subsequent stage of the I/O unit; a slave processing circuit connected to the preceding-stage branch-line terminal and the subsequent-stage branch-line terminal and configured to perform input and output of a signal with respect to the master processing circuit; and a subsequent-stage main-line terminal connected to the preceding-stage main-line terminal not via the slave processing circuit and configured to be connected to the first connection terminal of the first connector module provided in the subsequent stage.

According to the aspects of the present invention, it is possible to provide a master unit that can be connected, from the subsequent side of a station, to a master unit of another station, and a communication system including such a master unit.

BRIEF DESCRIPTION OF DRAWINGS

FIG. 5 is a diagram illustrating a station according to the second modification.

DETAILED DESCRIPTION OF THE INVENTION

Preferred embodiments of a master unit, and a communication system according to the present invention will be described in detail below with reference to the accompanying drawings.

Embodiments

Figure 1:
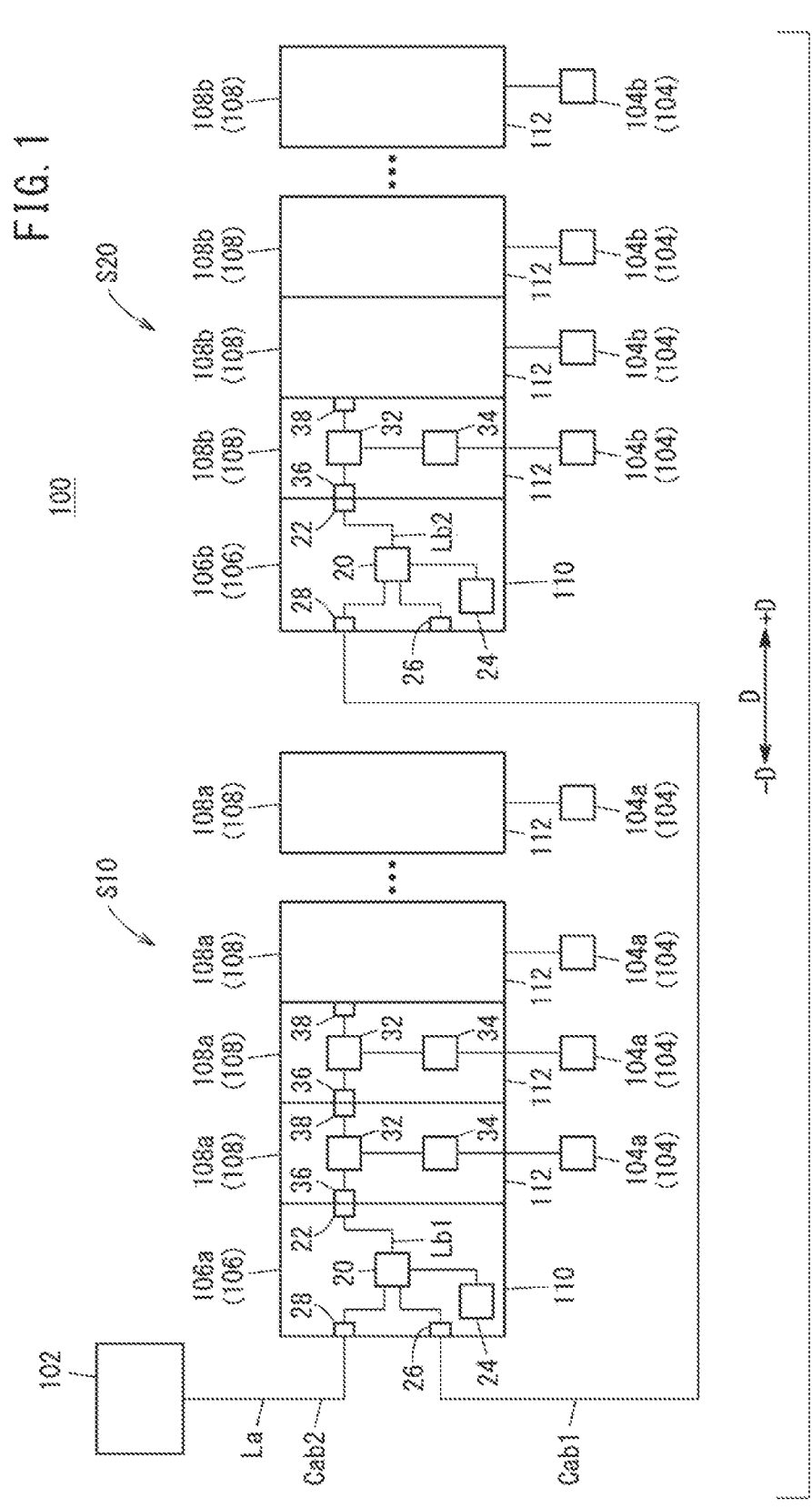
FIG. 1 is a diagram illustrating a communication system according to a reference example of the present invention.

FIG. 1 is a diagram illustrating a communication system 100 according to a reference example of the present invention.

The communication system 100 is a system that transmits signals between a control device 102 and a device 104. The device 104 is provided in a mechanical apparatus. The mechanical apparatus is, for example, a machine tool or a robot. The device 104 includes an output device 104*a* and an input device 104*b*. The output device 104*a* is, for example, an actuator such as a switch. When driving the output device 104*a*, the control device 102 sends a control signal to the output device 104*a* via the communication system 100. The input device 104*b* is, for example, a sensor that detects pressure, voltage, current, or the like. The control device 102 acquires a detection signal from the input device 104*b*, via the communication system 100.

The communication system 100 includes two communication coupler units 106 (106*a* and 106*b*) and a plurality of I/O units (input/output units) 108 (108*a* and 108*b*). The plurality of I/O units 108*a* are sequentially connected in the subsequent stage of the communication coupler unit 106*a*. In this case, the communication coupler unit 106*a* is a master unit of the plurality of I/O units 108*a*. Each of the plurality of I/O units 108*a* is a slave unit of the communication coupler unit 106*a*.

The communication coupler unit 106*a* and the plurality of I/O units 108*a* constitute one station S10. An arrow D in FIG. 1 indicates an installation direction (+D: a subsequent stage side, −D: a preceding stage side) in which the communication coupler unit 106*a* and the plurality of I/O units 108*a* are arranged.

The plurality of I/O units 108*b* are sequentially connected in the subsequent stage of the communication coupler unit 106*b*. Thus, the communication coupler unit 106*b* is a master unit of the plurality of I/O units 108*b*. Each of the plurality of I/O units 108*b* is a slave unit of the communication coupler unit 106*b*. The communication coupler unit 106*b* and the plurality of I/O units 108*b* constitute one station S20. The communication coupler unit 106*b* and the plurality of I/O units 108*b* are arranged in the installation direction D.

In the following description, the configurations of the communication coupler unit 106 and the I/O unit 108 will be further described in order.

The communication coupler unit 106 includes a master processing circuit 20, a branch-line terminal 22, a power supply unit 24, a first connector 26, a second connector 28, and a housing 110. The master processing circuit 20, the branch-line terminal 22, the power supply unit 24, the first connector 26, and the second connector 28 are accommodated in the housing 110.

The master processing circuit 20 includes, for example, a central processing unit (CPU). However, the master processing circuit 20 may include an application specific integrated circuit (ASIC), a programmable logic device (PLD), a field programmable logic gate array (FPGA), or the like.

The power supply unit 24 supplies electric power to the master processing circuit 20. However, the power supply unit 24 may supply electric power to the plurality of I/O units 108 provided on the subsequent stage side of the communication coupler unit 106.

The first connector 26 is a connector for connection to another communication coupler unit 106 provided in the subsequent stage of the communication coupler unit 106. The second connector 28 is a connector for connection to the control device 102 provided in the preceding stage of the communication coupler unit 106 or another communication coupler unit 106 provided in the preceding stage of the communication coupler unit 106. In one communication coupler unit 106, the first connector 26 and the second connector 28 are connected to the master processing circuit 20. The first connector 26 and the second connector 28 are provided on a side surface of the communication coupler unit 106 that is located on the preceding stage (−D) side, for example, as shown in FIG. 1.

In the example of FIG. 1, the first connector 26 of the communication coupler unit 106*a* is connected to the second connector 28 of the communication coupler unit 106*b* via a connection member Cab1 separately prepared by the operator. The connection member Cab1 is, for example, a cable. The second connector 28 of the communication coupler unit 106*a* is connected to the control device 102 via a connection member Cab2 separately prepared by the operator. As a result, the control device 102, the master processing circuit 20 of the communication coupler unit 106*a*, and the master processing circuit 20 of the communication coupler unit 106*b* are connected together in this order. The first connector 26 of the communication coupler unit 106*b* is open in this reference example. When another communication coupler unit 106 is further installed at the subsequent stage of the communication coupler unit 106*b*, the first connector 26 of the communication coupler unit 106*b* is connected to the second connector 28 of the other communication coupler unit 106.

The branch-line terminal 22 is a terminal for connection to the I/O unit 108. In one communication coupler unit 106, the branch-line terminal 22 is connected to the master processing circuit 20. The branch-line terminal 22 is provided on a side surface of the communication coupler unit 106 that is located on the subsequent stage (+D) side.

The I/O unit 108 includes a slave processing circuit 32, an interface 34, a preceding-stage branch-line terminal 36, a subsequent-stage branch-line terminal 38, and a housing 112. The slave processing circuit 32, the interface 34, the preceding-stage branch-line terminal 36, and the subsequent-stage branch-line terminal 38 are accommodated in the housing 112.

The slave processing circuit 32 includes, for example, a central processing unit (CPU). However, the slave processing circuit 32 may include an application specific integrated circuit (ASIC), a programmable logic device (PLD), a field programmable logic gate array (FPGA), or the like. The slave processing circuit 32 performs input/output of signals with respect to the master processing circuit 20.

The interface 34 is hardware (a circuit or an electronic component group) that connects the slave processing circuit 32 and the device 104 and allows the slave processing circuit 32 to perform input-output of signals with respect to the device 104. The specific configuration of the interface 34 varies depending on the type of the device 104.

The plurality of I/O units 108 are connected to the plurality of devices 104. The plurality of I/O units 108 in FIG. 1 are connected respectively to the different devices 104. However, a plurality of devices 104 may be connected to one I/O unit 108.

The preceding-stage branch-line terminal 36 is a terminal for connection to the communication coupler unit 106 provided in the preceding stage or another I/O unit 108 provided in the preceding stage. The preceding-stage branch-line terminal 36 is provided on the preceding stage (−D) side of the I/O unit 108. The subsequent-stage branch-line terminal 38 is a terminal for connection to another I/O unit 108 provided in the subsequent stage. The subsequent-stage branch-line terminal 38 is provided on the subsequent stage (+D) side of the I/O unit 108. In one I/O unit 108, the preceding-stage branch-line terminal 36 and the subsequent-stage branch-line terminal 38 are connected to each other via the slave processing circuit 32.

When the preceding stage of the I/O unit 108 is the communication coupler unit 106, the preceding-stage branch-line terminal 36 is connected to the branch-line terminal 22. As a result, the master processing circuit 20 of the communication coupler unit 106 is connected to the slave processing circuit 32 of the I/O unit 108 in the subsequent stage.

When the preceding stage of the I/O unit 108 is another I/O unit 108, the preceding-stage branch-line terminal 36 is connected to the subsequent-stage branch-line terminal 38 of the other I/O unit 108. Accordingly, the slave processing circuits 32 of the plurality of I/O units 108 are daisy-chain connected to each other with the master processing circuit 20 of the communication coupler unit 106 being at the head.

When the control device 102 transmits a control signal to the device 104, the control device 102 outputs the control signal to the communication coupler unit 106a connected to the first stage (first) as viewed from the control device 102 itself. The control signal includes address information etc. of the I/O unit 108 to which the device 104 as a transmission target is connected. The master processing circuit 20 of the communication coupler unit 106a determines whether the address information included in the control signal indicates any one of the plurality of I/O units 108a. When the address information does not indicate any one of the plurality of I/O units 108a, the master processing circuit 20 of the communication coupler unit 106a outputs the control signal to the master processing circuit 20 of the communication coupler unit 106b. When the address information indicates any one of the plurality of I/O units 108a, the master processing circuit 20 of the communication coupler unit 106a outputs the control signal to the I/O unit 108a provided in the subsequent stage of the communication coupler unit 106a itself. The slave processing circuit 32 of the I/O unit 108a that has received the control signal from the preceding stage determines whether or not the address information included in the received control signal indicates the I/O unit 108a itself. When the address information indicates the I/O unit 108a itself, the slave processing circuit 32 of the I/O unit 108a outputs the control signal to the device 104 connected to the I/O unit 108a itself. Thus, the device 104 is caused to operate. On the other hand, when the address information included in the input control signal does not indicate the I/O unit 108a itself, the I/O unit 108a outputs the control signal to an I/O unit 108a provided in the subsequent stage of the I/O unit 108a itself. When the address information included in the control signal indicates the I/O unit 108 itself, the I/O unit 108 may output the control signal to an I/O unit 108 provided in the subsequent stage. In addition, when the address information included in the control signal indicates the I/O unit 108 connected to the communication coupler unit 106 itself, the communication coupler unit 106 may output the control signal to the next communication coupler unit 106 provided in the subsequent stage.

There is a case where the device 104 may output a signal to the control device 102. In this case, the signal of the device 104 is input to the slave processing circuit 32 of the I/O unit 108 to which the device 104 is connected. The slave processing circuit 32 transmits a signal input from the device 104 connected to the slave processing circuit 32 itself, to the control device 102. In this case, the slave processing circuit 32 outputs the signal to the I/O unit 108 or the communication coupler unit 106 connected to the preceding stage of the slave processing circuit 32 itself. Here, the slave processing circuit 32 adds the content output by the device 104 and the address information of the I/O unit 108 that has output the signal, to the output signal. The input and output of signals between the communication coupler unit 106 and the I/O unit 108 is a well-known technique and thus further description thereof is omitted.

Incidentally, the connection member Cab1 has to bypass the plurality of I/O units 108a in order to connect the station S10 and the station S20 (see FIG. 1).

In light of the above, embodiments of the present invention will be described below. Components similar to the components described in the reference example are denoted by the same reference numerals, description thereof is omitted, and portions different from the reference example will be mainly described.

Figure 2:
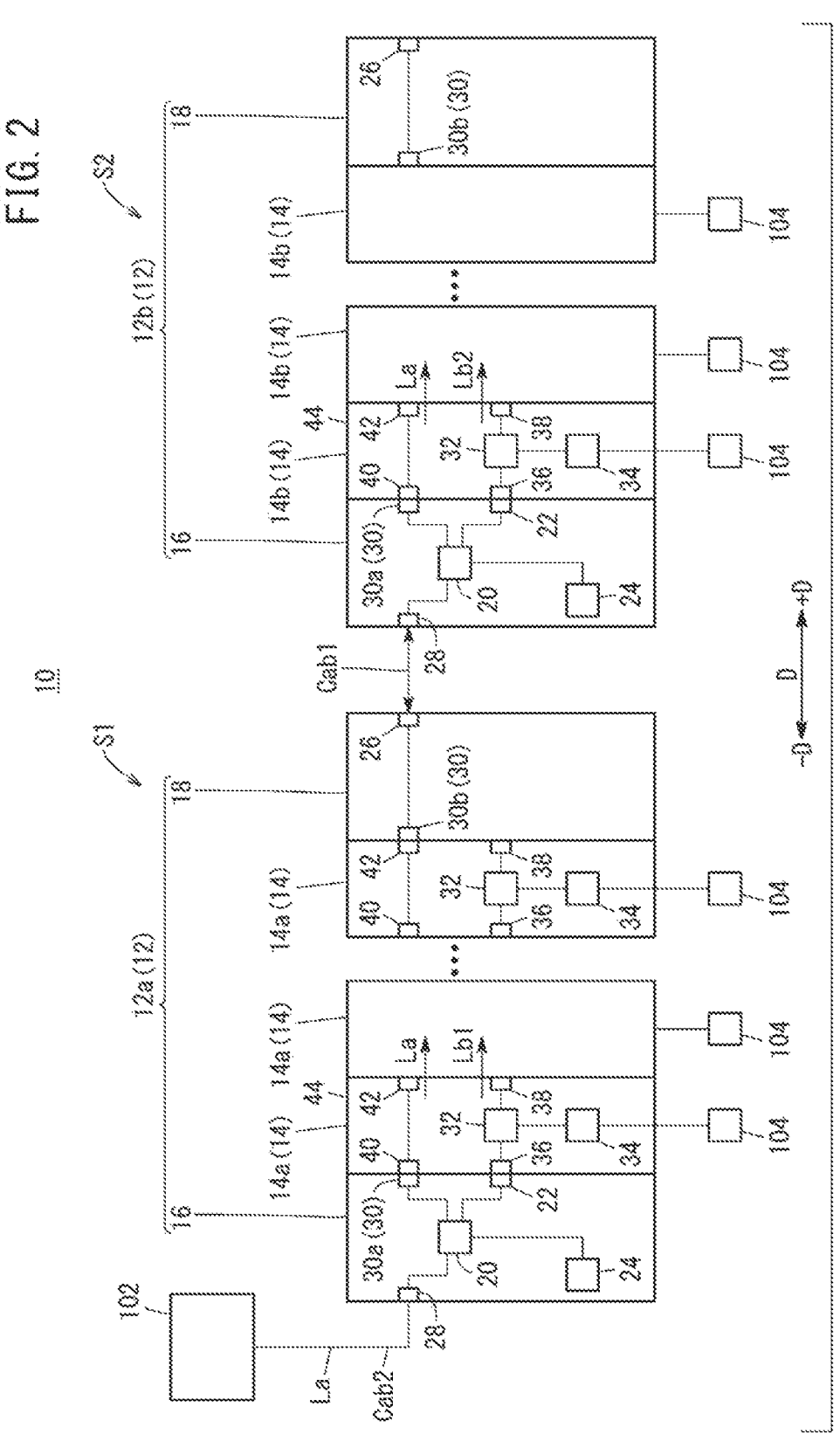
FIG. 2 is a diagram showing a communication system according to an embodiment of the present invention.

FIG. 2 is a diagram illustrating a communication system 10 according to an embodiment of the present invention.

As illustrated in FIG. 2, the communication system 10 includes a communication coupler unit 12a, a communication coupler unit 12b, a plurality of I/O units 14a, and a plurality of I/O units 14b. The communication coupler unit 12a is a master unit of the plurality of I/O units 14a. The communication coupler unit 12a and the plurality of I/O units 14a constitute a station S1. The communication coupler unit 12b is a master unit of the plurality of I/O units 14b. The communication coupler unit 12b and the plurality of I/O units 14b constitute a station S2.

In the following description, the communication coupler unit 12a and the communication coupler unit 12b are also simply referred to as communication coupler units 12. In the following description, the I/O unit 14a and the I/O unit 14b are also simply referred to as the I/O unit 14.

The communication coupler unit 12 includes a plurality of modules that can be separated from each other. That is, the communication coupler unit 12 includes a main module 16 and a connector module (first connector module) 18. The main module 16 and the connector module 18 are separable from each other.

The main module 16 includes a master processing circuit 20, a branch-line terminal 22, a power supply unit 24, and a second connector 28. The second connector 28 is provided at a position avoiding the subsequent stage (+D) side of the main module 16. For example, the second connector 28 is provided on the preceding stage (−D) side of the main module 16 (see FIG. 2). The branch-line terminal 22 is provided on the subsequent stage (+D) side of the main module 16. The master processing circuit 20 is connected to the branch-line terminal 22, the power supply unit 24, and the second connector 28.

The connector module 18 has a first connector 26. The first connector 26 is provided on the subsequent stage (+D) side of the connector module 18.

Each of the main module 16 and the connector module 18 further includes a connection terminal (first connection terminal) 30. In the following description, the connection terminal 30 of the main module 16 is also referred to as a connection terminal 30a, and the connection terminal 30 of the connector module 18 is also referred to as a connection terminal 30b. The connection terminal 30a is provided on the subsequent stage (+D) side of the main module 16 and is connected to the master processing circuit 20. On the other hand, the connection terminal 30b is provided on the preceding stage (−D) side of the connector module 18 and is connected to the first connector 26.

Each of the I/O units 14 includes a slave processing circuit 32, an interface 34, a preceding-stage branch-line terminal 36, a subsequent-stage branch-line terminal 38, a preceding-stage main-line terminal 40, a subsequent-stage main-line terminal 42, and a housing 44. The slave processing circuit 32, the interface 34, the preceding-stage branch-line terminal 36, the subsequent-stage branch-line terminal 38, the preceding-stage main-line terminal 40, and the subsequent-stage main-line terminal 42 are accommodated in the housing 44.

The preceding-stage main-line terminal 40 is a terminal for connection to the main module 16 provided in the preceding stage or another I/O unit 14 provided in the preceding stage. The preceding-stage main-line terminal 40 is provided on the preceding stage (−D) side of the I/O unit 14. The subsequent-stage main-line terminal 42 is a terminal for connection to the connector module 18 provided in the subsequent stage or another I/O unit 14 provided in the subsequent stage. The subsequent-stage main-line terminal 42 is provided on the subsequent stage (+D) side of the I/O unit 14.

When the preceding stage of the I/O unit 14 is the main module 16, the preceding-stage main-line terminal 40 of the I/O unit 14 is connected to the connection terminal 30a. When the preceding stage of the I/O unit 14 is another I/O unit 14, the preceding-stage main-line terminal 40 of the I/O unit 14 is connected to the subsequent-stage main-line terminal 42 of the other I/O unit 14. When the subsequent stage of the I/O unit 14 is the connector module 18, the subsequent-stage main-line terminal 42 of the I/O unit 14 is connected to the connection terminal 30b. In a case where the subsequent stage of the I/O unit 14 is the connector module 18, the subsequent-stage branch-line terminal 38 of the I/O unit 14 remains in an open state.

In one I/O unit 14, the preceding-stage main-line terminal 40 and the subsequent-stage main-line terminal 42 are connected to each other. Therefore, the preceding-stage main-line terminal 40 and the subsequent-stage main-line terminal 42 can connect the master processing circuit 20 of the main module 16 provided in the preceding stage of the I/O unit 14 and the first connector 26 of the first connector module 18 provided in the subsequent stage of the I/O unit 14. The preceding-stage main-line terminal 40 and the subsequent-stage main-line terminal 42 are connected to each other not via the slave processing circuit 32 (see also FIG. 2).

With the configuration of the I/O unit 14 in mind, the station S1 and the station S2 will be further described. Each of the station S1 and the station S2 includes a main module 16. A plurality of I/O units 14 are sequentially connected to the subsequent stage of the main module 16 of the station S1. Accordingly, in the station S1, a communication path (branch line Lb1) is formed in which the master processing circuit 20 and the plurality of slave processing circuits 32 are sequentially connected. Further, a plurality of I/O units 14 other than the I/O units in the station S1 are sequentially connected to the subsequent stage of the main module 16 of the station S2. Accordingly, in the station S2, a communication path (branch line Lb2) is formed in which the master processing circuit 20 and the plurality of slave processing circuits 32 are sequentially connected.

The first connector module 18 is provided at the last stage of each of the station S1 and the station S2. In each of the stations S1 and S2, the master processing circuit 20 of the main module 16 and the first connector 26 of the first connector module 18 are connected to each other via the I/O units 14.

The second connector 28 of the main module 16 of the station S1 is connected to the control device 102 by means of a connection member Cab2. Also, the second connector 28 of the main module 16 of the station S2 is connected to the first connector 26 of the connector module 18 of the station S1 by means of a connection member Cab1. Accordingly, a communication path (main line La) is formed in which the master processing circuit 20 of the station S1 and the master processing circuit 20 of the station S2 are sequentially connected in this order with the control device 102 being at the head. Here, the slave processing circuit 32 is not arranged on the main line La. Therefore, a signal transmitted between the master processing circuit 20 of the station S1 and the master processing circuit 20 of the station S2 is not erroneously input to the slave processing circuit 32 in the communication system 10.

According to the communication system 10 described above, the first connector 26 is disposed at the last stage of the station S1. When connecting the first connector 26 of the station S1 and the second connector 28 of the station S2 by means of the connection member Cab1, the operator does not need to cause the connection member Cab1 to detour the plurality of I/O units 14a.

Modifications

The embodiment has been described above as an example of the present invention. It is noted that various modifications or improvements are capable of being added to the above-described embodiment. Further, it is clear from the scope of the claims that other modes to which such modifications or improvements have been added can be included within the technical scope of the present invention.

Hereinafter, exemplary modifications according to the embodiment will be described. However, explanations that overlap with those of the embodiment will be omitted insofar as possible in the following description. Components that have already been described in the above embodiment are denoted by the same reference numerals as in the above embodiment unless otherwise indicated. Note that constituent elements that have already been described in the above embodiment include functionally identical elements.

Modification 1

Figure 3:
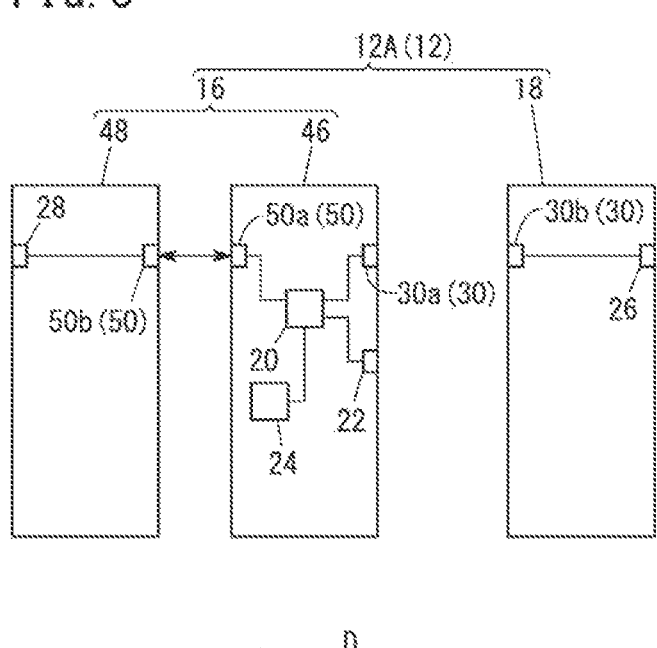
FIG. 3 is a diagram illustrating a communication coupler unit according to a first modification.

FIG. 3 is a diagram illustrating a communication coupler unit 12A (12) according to a first modification.

In the following, the connector module 18 of FIG. 2 is also referred to as the first connector module 18. In the following description, the connection terminals 30 (30a, 30b) in FIG. 2 are also referred to as first connection terminals 30 (30a, 30b). The communication coupler unit 12A includes a main module 16. However, the main module 16 according to the present modification can be further divided into a signal processing module 46 and a second connector module 48. The signal processing module 46 is a module including the master processing circuit 20, the branch-line terminal 22, and the power supply unit 24. The second connector module 48 is a module including the second connector 28.

Each of the signal processing module 46 and the second connector module 48 further includes a second connection terminal 50. In the following description, the second connection terminal 50 of the signal processing module 46 is also referred to as a second connection terminal 50a, and the second connection terminal 50 of the second connector module 48 is also referred to as a second connection terminal 50b. The second connection terminals 50a and 50b are detachably connected to each other. When the second connection terminals 50a and 50b are connected to each other, the signal processing module 46 and the second connector module 48 are connected to each other.

The second connection terminal 50a is provided on the preceding stage (−D) side of the signal processing module 46, and is connected to the master processing circuit 20 in the signal processing module 46. The second connection terminal 50b is provided on the subsequent stage (+D) side of the second connector module 48, and is connected to the second connector 28 in the second connector module 48. According to the present modification, when the second connection terminals 50a and 50b are connected to each other, the master processing circuit 20 and the second connector 28 are connected to each other.

According to the present modification, the maintainability of the main module 16 is improved. For example, when the second connector 28 fails to operate properly, the operator can complete the maintenance work of the main module 16 only by replacing the second connector module 48 while leaving normal parts such as the master processing circuit 20, the power supply unit 24, etc., as they are.

Modification 2

In relation to the first modification, modules of substantially the same type may be configured by standardizing the first connector module 18 and the second connector module 48.

Figure 4:
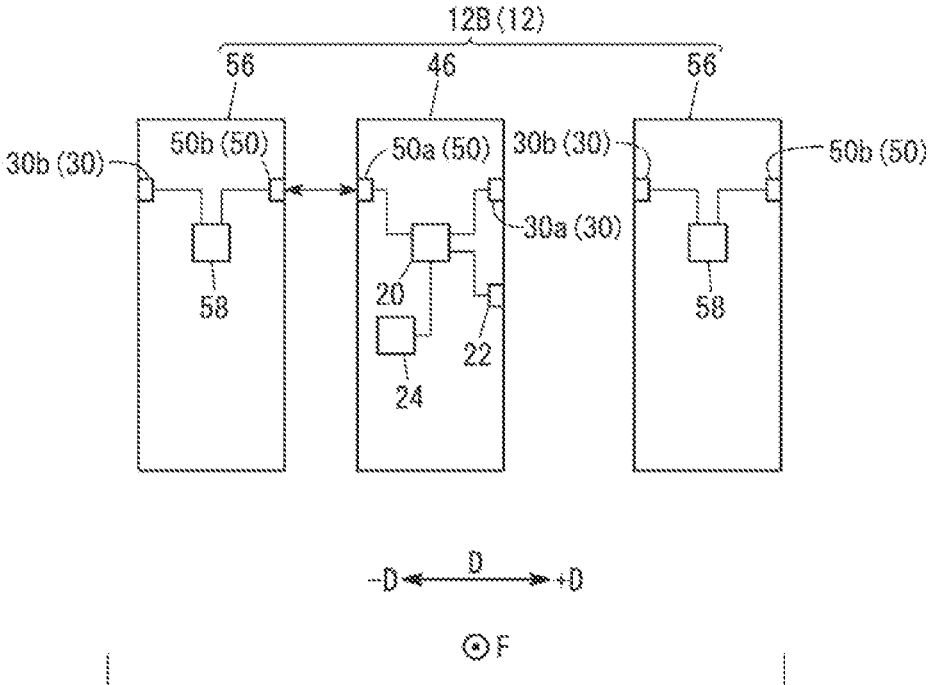
FIG. 4 is a diagram illustrating a communication coupler unit according to a second modification.

FIG. 4 is a diagram illustrating a communication coupler unit 12B (12) according to a second modification.

The communication coupler unit 12B (12) includes a signal processing module 46 and two common connector modules 56. Description of the signal processing module 46 is omitted (see Modification 1).

Each of the two common connector modules 56 includes the first connection terminal 30b (30), the second connection terminal 50b (50), and a common connector 58 connected to the first and second connection terminals. The first connection terminal 30b (30) is provided on the preceding stage (−D) side of the common connector module 56. The second connection terminal 50b (50) is provided on the subsequent stage (+D) side of the common connector module 56. The common connector 58 is a connector formed by standardizing the first connector 26 and the second connector 28. The common connector 58 can be used as both the first connector 26 and the second connector 28.

The common connector 58 is provided at a position avoiding the preceding stage (−D) side and the subsequent stage (+D) side of the common connector module 56, for example, on a surface on a side of the common connector module 56 that faces in a direction (direction F in FIG. 4) orthogonal to the installation direction D. Owing to this configuration, even in a case where another device is provided on either the preceding stage side or the subsequent stage side of the common connector module 56, connection of the connection member (Cab1, Cab2) to the common connector 58 is not inhibited.

FIG. 5 is a diagram illustrating a station S3 according to a second modification.

The station S3 includes a communication coupler unit 12B (12) and an I/O unit (or a plurality of I/O units) 14.

The second connection terminal 50b (50) of one (56A) of the two common connector modules 56 may be connected to the second connection terminal 50a of the signal processing module 46. In this case, the common connector 58 of the common connector module 56A is connected to the control device 102 provided in the preceding stage of the station S3. That is, the common connector 58 of the common connector module 56A functions as the second connector module 48 (see the first modification).

On the other hand, the first connection terminal 30b of the other (56B) of the two common connector modules 56 can be connected to the subsequent-stage main-line terminal 42 of the I/O unit 14. In this case, the common connector 58 of the common connector module 56B is connected to another communication coupler unit 12 (not shown in FIG. 5) provided in the subsequent stage of the station S3. That is, the common connector 58 of the common connector module 56B can be used as the connector module 18 (see the embodiment).

According to the present modification, the production line can be shared by the first connector module 18 and the second connector module 48 (i.e., multiple production lines can be unified as one production line shared by the common connector modules 56). Therefore, the communication coupler unit 12 according to the present modification is advantageous in reducing the manufacturing cost. Further, it is not necessary for the operator to carefully use the first connector module 18 (for connection to the subsequent stage side) and the second connector module 48 (for connection to the preceding stage side).

Modification 3

Figure 6:
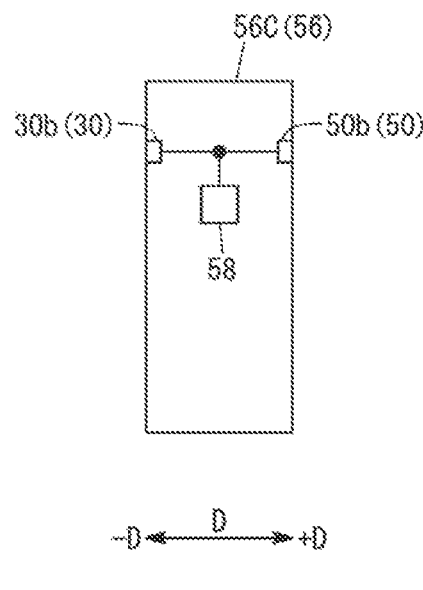
FIG. 6 is a diagram illustrating a common connector module according to a third modification.

FIG. 6 is a diagram illustrating a common connector module 56C (56) according to a third modification.

The common connector module 56C has a structure in which the first connection terminal 30b (30), the second connection terminal 50b (50), and the common connector 58 are connected in a T-connection manner. In this case, the stub length of the circuit (signal line) connecting the first connection terminal 30b (30), the second connection terminal 50b (50), and the common connector 58 is shorter than that in the configuration example of FIG. 4. Since the stub length is shortened, signal noise between the first connection terminal 30b (30) and the common connector 58 or between the second connection terminal 50b (50) and the common connector 58 is reduced.

Inventions that can be Obtained from the Embodiment

The inventions that can be grasped from the above-described embodiment and the modifications thereof will be described below.

First Invention

A first invention is characterized by the master unit (12) that transmits a signal, via the I/O unit (14), to the device (104) connected to the I/O unit, the master unit (12) including: the master processing circuit (20) configured to perform signal processing; the first connector (26, 58) configured to be connected to the other master unit (12) provided in the subsequent stage of the master processing circuit; the second connector (28, 58) configured to be connected to the control device (102) provided in the preceding stage of the master processing circuit or the other master unit (12) provided in the preceding stage; the branch-line terminal (22) configured to be connected to the I/O unit; and the power supply unit (24) configured to supply electric power to the master processing circuit, wherein the master unit is divided into: the first connector module (18, 56) including the first connector; and the main module (16) including the master processing circuit, the second connector, the branch-line terminal, and the power supply unit, wherein the second connector, the branch-line terminal, and the power supply unit are connected to the master processing circuit, and wherein each of the first connector module and the main module further includes the first connection terminal (30) configured to connect the first connector and the master processing circuit via the I/O unit.

This provides a master unit that can be connected, from the subsequent stage side of the station, to a master unit of another station.

The main module may be divided into: the second connector module (48, 56) including the second connector; and the signal processing module (46) including the branch-line terminal, the master processing circuit, and the power supply unit, and each of the second connector module and the signal processing module may further include the second connection terminal (50) configured to connect the second connector and the master processing circuit. Thus, the maintainability for the main module is improved.

The first connector module and the second connector module may be standardized and thereby each formed as a common connector module (56), and the common connector module may include: the first connection terminal; the second connection terminal; and the common connector (58) that is a connector formed by standardizing the first connector and the second connector and that is connected to the first connection terminal and the second connection terminal. This improves the user-friendliness of the master unit from the viewpoint of both the producer and the operator.

The first connection terminal, the second connection terminal, and the common connector may be connected in a T-connection manner. With this configuration, noise can be reduced.

Second Invention

A second invention is characterized by the communication system (10) including the I/O unit (14) to which the device (104) is connected, and the master unit (12) configured to transmit a signal to the device via the I/O unit, wherein the master unit includes: the master processing circuit (20) configured to perform signal processing; the first connector (26, 58) configured to be connected to the other master unit (12) provided in the subsequent stage of the master processing circuit; the second connector (28, 58) configured to be connected to the control device (102) provided in the preceding stage of the master processing circuit or the other master unit (12) provided in the preceding stage; the branch-line terminal (22) configured to be connected to the I/O unit; and the power supply unit (24) configured to supply electric power to the master processing circuit, wherein the master unit is divided into: the first connector module (18, 56) including the first connector; and the main module (16) including the master processing circuit, the second connector, the branch-line terminal, and the power supply unit, wherein the second connector, the branch-line terminal, and the power supply unit are connected to the master processing circuit, wherein each of the first connector module and the main module further includes the first connection terminal (30) configured to connect the first connector and the master processing circuit via the I/O unit, and wherein the I/O unit includes: the preceding-stage main-line terminal (40) and the preceding-stage branch-line terminal (36) configured to be connected to the first connection terminal and the branch-line terminal of the main module provided in the preceding stage of the I/O unit; the subsequent-stage branch-line terminal (38) configured to be connected to the preceding-stage branch-line terminal of the other I/O unit (14) provided in the subsequent stage of the I/O unit; the slave processing circuit (32) connected to the preceding-stage branch-line terminal and the subsequent-stage branch-line terminal and configured to perform input and output of a signal with respect to the master processing circuit; and the subsequent-stage main-line terminal (42) connected to the preceding-stage main-line terminal not via the slave processing circuit and configured to be connected to the first connection terminal of the first connector module provided in the subsequent stage.

This provides a communication system including a master unit that can be connected, from the subsequent stage side of the station, to a master unit of another station.

The invention claimed is:

1. A master unit that transmits a signal, via an input/output unit, to a device connected to the input/output unit, the master unit comprising:
   a master processing circuit configured to perform signal processing;
   a first connector configured to be connected to another master unit provided in a subsequent stage of the master processing circuit;
   a second connector configured to be connected to a control device provided in a preceding stage of the master processing circuit or another master unit provided in the preceding stage;
   a branch-line terminal configured to be connected to the input/output unit; and
   a power supply unit configured to supply electric power to the master processing circuit,
   wherein the master unit is divided into:
   a first connector module including the first connector; and
   a main module including the master processing circuit, the second connector, the branch-line terminal, and the power supply unit, wherein the second connector, the branch-line terminal, and the power supply unit are connected to the master processing circuit, and
   wherein each of the first connector module and the main module further includes a first connection terminal,
   the first connection terminal of the main module and the first connection terminal of the first connector module are connected to a preceding-stage main-line terminal and a preceding-stage branch-line terminal of one or more input/output units, respectively, between the main module and the first connector module and connect the first connector and the master processing circuit to each other via the one or more input/output units.

2. The master unit according to claim 1, wherein the main module is divided into:
   a second connector module including the second connector; and a signal processing module including the branch-line terminal, the master processing circuit, and the power supply unit, and each of the second connector module and the signal processing module further includes a second connection terminal configured to connect the second connector and the master processing circuit.

3. A master unit that transmits a signal, via an input/output unit, to a device connected to the input/output unit, the master unit comprising:

a master processing circuit configured to perform signal processing;

a first connector configured to be connected to another master unit provided in a subsequent stage of the master processing circuit;

a second connector configured to be connected to a control device provided in a preceding stage of the master processing circuit or another master unit provided in the preceding stage;

a branch-line terminal configured to be connected to the input/output unit; and a power supply unit configured to supply electric power to the master processing circuit, wherein the master unit is divided into:

a first connector module including the first connector; and a main module including the master processing circuit, the second connector, the branch-line terminal, and the power supply unit, wherein the second connector, the branch-line terminal, and the power supply unit are connected to the master processing circuit, and wherein each of the first connector module and the main module further includes a first connection terminal configured to connect the first connector and the master processing circuit via the input/output unit, wherein the main module is divided into:

a second connector module including the second connector; and a signal processing module including the branch-line terminal, the master processing circuit, and the power supply unit, and each of the second connector module and the signal processing module further includes a second connection terminal configured to connect the second connector and the master processing circuit, the first connector module and the second connector module are standardized and thereby each formed as a common connector module, and the common connector module includes:

the first connection terminal;

the second connection terminal; and a common connector that is a connector formed by standardizing the first connector and the second connector and that is connected to the first connection terminal and the second connection terminal.

4. The master unit according to claim 3, wherein the first connection terminal, the second connection terminal, and the common connector are connected in a T-connection manner.

5. A communication system comprising an input/output unit to which a device is connected, and a master unit configured to transmit a signal to the device via the input/output unit, wherein the master unit includes:

a master processing circuit configured to perform signal processing;

a first connector configured to be connected to another master unit provided in a subsequent stage of the master processing circuit;

a second connector configured to be connected to a control device provided in a preceding stage of the master processing circuit or another master unit provided in the preceding stage;

a branch-line terminal configured to be connected to the input/output unit; and a power supply unit configured to supply electric power to the master processing circuit, wherein the master unit is divided into:

a first connector module including the first connector; and a main module including the master processing circuit, the second connector, the branch-line terminal, and the power supply unit, wherein the second connector, the branch-line terminal, and the power supply unit are connected to the master processing circuit, wherein each of the first connector module and the main module further includes a first connection terminal configured to connect the first connector and the master processing circuit via the input/output unit, and wherein the input/output unit includes:

a preceding-stage main-line terminal and a preceding-stage branch-line terminal configured to be connected to the first connection terminal and the branch-line terminal of the main module provided in a preceding stage of the input/output unit;

a subsequent-stage branch-line terminal configured to be connected to the preceding-stage branch-line terminal of another input/output unit provided in a subsequent stage of the input/output unit;

a slave processing circuit connected to the preceding-stage branch-line terminal and the subsequent-stage branch-line terminal and configured to perform input and output of a signal with respect to the master processing circuit; and a subsequent-stage main-line terminal connected to the preceding-stage main-line terminal not via the slave processing circuit and configured to be connected to the first connection terminal of the first connector module provided in the subsequent stage.

* * * * *